(12) United States Patent
Lu (10) Patent No.: US 10,462,270 B2
(45) Date of Patent: Oct. 29, 2019

(54) A-MSDU SUBFRAME PROCESSING METHOD AND WIRELESS NETWORK ACCESS DEVICE

(71) Applicant: Accton Technology Corporation, Hsinchu (TW)

(72) Inventor: Tan-Chun Lu, New Taipei (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 16/110,248

(22) Filed: Aug. 23, 2018

(65) Prior Publication Data

US 2019/0104208 A1    Apr. 4, 2019

(30) Foreign Application Priority Data

Sep. 30, 2017   (CN) .......................... 2017 1 0924262

(51) Int. Cl.
*H04L 29/08*            (2006.01)

(52) U.S. Cl.
CPC .................................. *H04L 69/324* (2013.01)

(58) Field of Classification Search
CPC ... H04L 69/324; H04L 12/4633; H04L 69/22; H04W 28/06
See application file for complete search history.

(56) References Cited

U.S. PATENT DOCUMENTS

| | | | | |
|---|---|---|---|---|
| 6,804,230 B1* | 10/2004 | Jennings | ................. | H04L 45/00 370/388 |
| 7,460,473 B1* | 12/2008 | Kodama | ................. | H04L 47/10 370/230 |
| 2003/0110344 A1* | 6/2003 | Szczepanek | ...... | H04L 12/40013 711/100 |
| 2004/0098535 A1* | 5/2004 | Narad | ..................... | H04L 49/90 711/104 |
| 2013/0311609 A1* | 11/2013 | Kragh | ................. | H04L 49/9047 709/217 |
| 2013/0347103 A1* | 12/2013 | Veteikis | .................. | H04L 43/04 726/22 |
| 2017/0142425 A1* | 5/2017 | Iguchi | .................. | H04N 21/236 |

* cited by examiner

*Primary Examiner* — Hoang-Chuong Q Vu
(74) *Attorney, Agent, or Firm* — Birch, Stewart, Kolasch & Birch, LLP (57) ABSTRACT

An A-MSDU sub-frame processing method is provided. The method includes: allocating a first sub-block and a second sub-block adjacent to the first sub-block in a memory when an Ethernet frame is received, wherein the first sub-block includes a block with a preset bit length, the second sub-block includes a block with a bit length corresponding to the Ethernet frame, and a pointer initially points to a first initial address in the second sub-block; sequentially storing header information of the Ethernet frame into the second sub-block according to a header format of the Ethernet frame; filling the first sub-block with length information of the Ethernet frame; shifting the pointer along a first direction to a second initial address whose distance shifted from the first initial address is the preset bit length; and reading out data in a length along a second direction from the second initial address to generate the A-MSDU sub-frame.

14 Claims, 6 Drawing Sheets

A-MSDU SUBFRAME PROCESSING METHOD AND WIRELESS NETWORK ACCESS DEVICE

CROSS REFERENCE TO RELATED APPLICATIONS

This application claims priority of Chinese Patent Application No. 201710924262.0 filed on Sep. 30, 2017 in the China Intellectual Property Office, the contents of which are incorporated by reference herein.

BACKGROUND OF THE INVENTION

Field of the Invention

Aspects of the present disclosure relate generally to the field of wireless communication networks, and more particularly, to an (aggregate MAC service data unit) A-MSDU sub-frame processing method and a wireless network access device.

Description of the Related Art

The term A-MSDU aggregation technique refers to a technique of aggregating multiple MAC Service Data Units (MSDUs) into a larger payload, which typically occurs at the Medium Access Control (MAC) layer. In particular, multiple MSDUs from a Logical Link Control (LLC) layer are received at the MAC layer. When the received MSDUs have the same receiver address (RA), transmitter address (TA) and service type, the multiple MSDUs may be aggregated into an A-MSDU frame by using the A-MSDU aggregation technique at the MAC layer. The current A-MSDU aggregation technique usually encapsulates each MSDU into an A-MSDU sub-frame first, and then aggregates the multiple A-MSDU sub-frames into the A-MSDU frame.

However, when a frame received at the MAC layer is an Ethernet frame, the device needs to convert the Ethernet frame to an 802.11 A-MSDU sub-frame format.

Figure 1A:
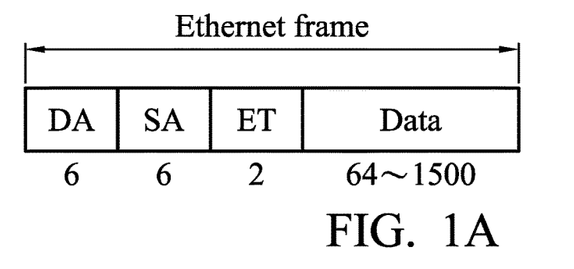
FIG. 1A is a schematic diagram illustrating a format of an Ethernet frame.

FIG. 1A is a schematic diagram illustrating the format of an Ethernet frame. As shown in FIG. 1A, the Ethernet frame may include a destination address (DA) field, a source address (SA) field, an Ethernet type (ET) field and a data field. The DA field and the SA field are each a 6-byte field. The ET field is a 2-byte field. The data field ranges from 46 to 1500 bytes. When the device receives the Ethernet frame, the processor of the device first stores information of each field (DA, SA, ET, Data) of the Ethernet frame in the memory of the device.

Figure 1B:
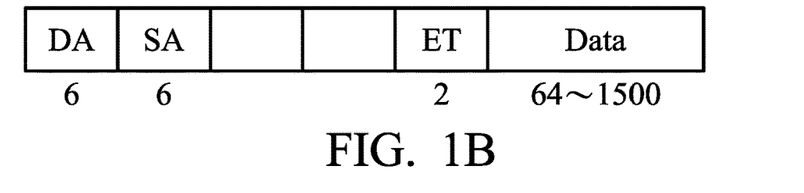
FIGS. 1B~1D are schematic diagrams illustrating the process of converting an Ethernet frame into an A-MSDU sub-frame format.
Figure 1C:
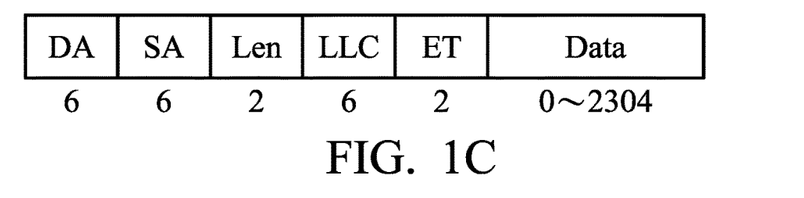
Figure 1D:
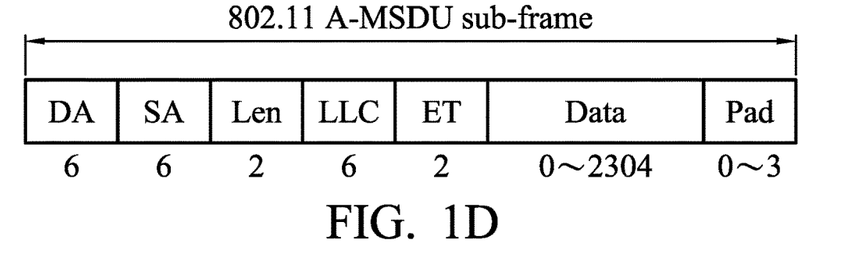

FIGS. 1B-1D are schematic diagrams illustrating the process of converting an Ethernet frame into an A-MSDU sub-frame format. As shown in FIG. 1B, the device first copies the DA field and the SA field according to a COPY command, and shifts the DA field and the SA field to the left by 8 bytes. Then, as shown in FIG. 1C, the device fills a length (Len) field and a logic link control (LLC) field into a position between the SA field and the ET field, wherein the Len field is a 2-byte field, and the LLC field is a 6-byte field. Finally, a pad field can be added behind the data field to generate an 802.11 A-MSDU sub-frame, as shown in FIG. 1D.

However, using a lot of COPY commands may increase the number of times that the device moves data, and therefore CPU resource consumption would also increase. Therefore, there is a need for an A-MSDU sub-frame processing method and a wireless network access device to improve transmission efficiency and throughput.

BRIEF SUMMARY OF THE INVENTION

The following summary is illustrative only and is not intended to be limiting in any way. That is, the following summary is provided to introduce concepts, highlights, benefits, and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

In order to reduce the number of times that the device performs the copy operation, and in order to improve transmission efficiency and throughput, an A-MSDU sub-frame processing method and a wireless network access device are provided in the disclosure.

An A-MSDU sub-frame processing method is disclosed in the disclosure, wherein the A-MSDU sub-frame is encapsulated in an A-MSDU packet. The method comprises: allocating a first sub-block and a second sub-block adjacent to the first sub-block in a memory when an Ethernet frame is received, wherein the first sub-block comprises a block with a preset bit length, the second sub-block comprises a block with a bit length corresponding to the Ethernet frame, and a pointer initially points to a first initial address in the second sub-block; sequentially storing header information of the Ethernet frame into the second sub-block according to a header format of the Ethernet frame; filling the first sub-block with length information of the Ethernet frame; shifting the pointer along a first direction to a second initial address whose distance shifted from the first initial address is the preset bit length; and reading out data in a length along a second direction from the second initial address to generate the A-MSDU sub-frame, wherein the length is the sum of the preset bit length and the bit length of the Ethernet frame.

A wireless access device is disclosed in the disclosure. The wireless access device comprises a control circuit, a processor and a memory. The processor is installed in the control circuit. The memory is installed in the control circuit and is operatively coupled to the processor. The processor is configured to execute program code stored in the memory to perform operations comprising: allocating a first sub-block and a second sub-block adjacent to the first sub-block in a memory when an Ethernet frame is received, wherein the first sub-block comprises a block with a preset bit length, the second sub-block comprises a block with a bit length corresponding to the Ethernet frame, and a pointer initially points to a first initial address in the second sub-block; sequentially storing header information of the Ethernet frame into the second sub-block according to a header format of the Ethernet frame; filling the first sub-block with length information of the Ethernet frame; shifting the pointer along a first direction to a second initial address whose distance shifted from the first initial address is the preset bit length; and reading out data in a length along a second direction from the second initial address to generate the A-MSDU sub-frame, wherein the length is the sum of the preset bit length and the bit length of the Ethernet frame.

According to the A-MSDU sub-frame processing method and the wireless network access device provided in the present disclosure, in each A-MSDU sub-frame, each Ethernet frame maintains its original format. The processor performs the actions of shifting the pointer and filling in the length information of the Ethernet frame without copying the data of the Ethernet frame to reduce the number of times that the device moves data to the memory for storage and to improve the throughput and the processing efficiency of the processor.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure.

DETAILED DESCRIPTION OF THE INVENTION

Various aspects of the disclosure are described more fully hereinafter with reference to the accompanying drawings. This disclosure may, however, be embodied in many different forms and should not be construed as limited to any specific structure or function presented throughout this disclosure.

Figure 2:
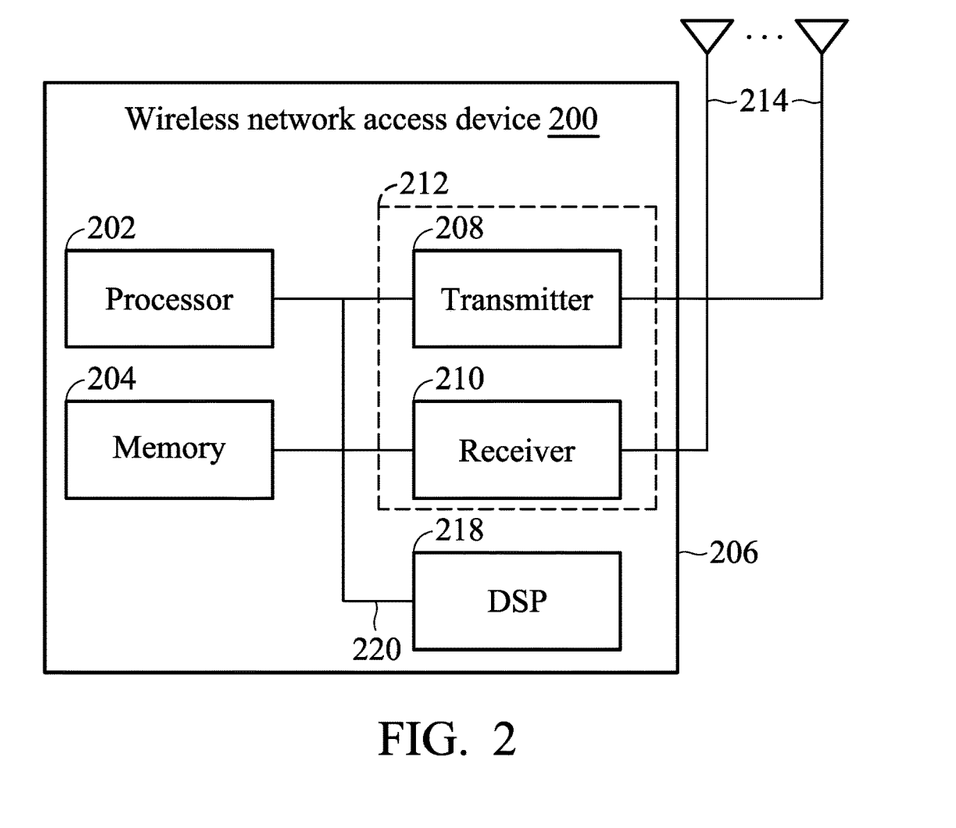
FIG. 2 shows an exemplary functional block diagram of a wireless network access device according to an embodiment of the present disclosure.

FIG. 2 shows an exemplary functional block diagram of a wireless network access device 200 according to an embodiment of the present disclosure. The wireless network access device 200 may be configured as an example of a device that implements the various methods described herein. For example, the wireless network access device 200 may be a wireless access point, a wireless network node, a station, and so on.

The wireless network access device 200 may include a processor 202 which controls the operation of the wireless network access device 200. The processor 202 may also be referred to as a central processing unit (CPU). A memory 204, which may include read-only memory (ROM) or random access memory (RAM), provides instructions and data to the processor 202. In other embodiment, the memory 204 may also include non-volatile random access memory (NVRAM). The processor 202 typically performs logical and arithmetic operations based on program instructions stored within the memory 204. The instructions in the memory 204 may be executable to implement the methods described herein.

The wireless network access device 200 may also include a housing 206 that may include a transmitter 208 and a receiver 210 to allow transmission and reception of data between the wireless network access device 200 and a remote device. The transmitter 208 and the receiver 210 may be combined into a transceiver 212. A single or a plurality of transmit antennas 214 may be attached to the housing 206 and electrically coupled to the transceiver 212. The wireless network access device 200 may also include (not shown) multiple transmitters, multiple receivers, and multiple transceivers. The wireless network access device 200 may also include a digital signal processor (DSP) 218 for use in processing signals.

The various components of the wireless network access device 200 may be coupled together by a bus system 220, which may include a power bus, a control signal bus, and a status signal bus in addition to a data bus.

Figure 3:
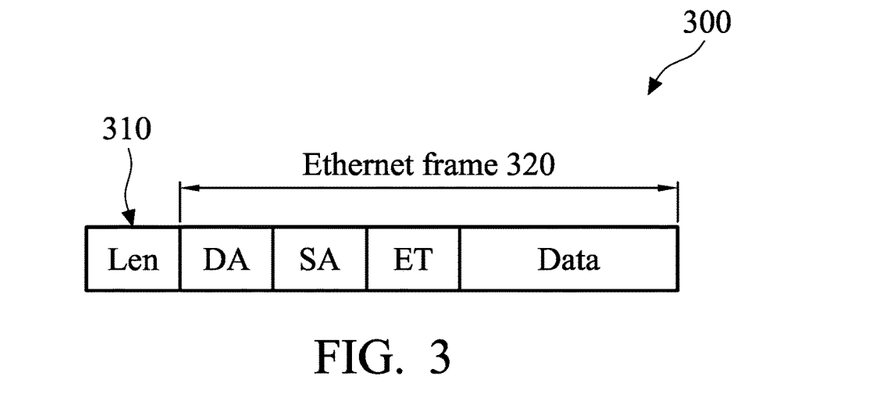
FIG. 3 shows an aggregated MAC service data unit (A-MSDU) sub-frame according to an embodiment of the present disclosure.

FIG. 3 shows an aggregated MAC service data unit (A-MSDU) sub-frame 300 according to an embodiment of the present disclosure. The A-MSDU sub-frame 300 includes an Ethernet frame 320 and a length (Len) field 310 in front of the Ethernet frame. The Len field 310 is a field with 2-byte bit length and indicates the length of the Ethernet frame 320.

The Ethernet frame 320 includes a destination address (DA) field, a source address (SA) field, an Ethernet type (ET) field, and a data field. The destination address field and the source address field are each six-byte values at the front end of the Ethernet frame 320. The address fields are followed by a two-byte Ethernet type field, which identifies the type of data. The data field ranges from 46 to 1500 bytes. In one embodiment, the Ethernet frame 320 is an Ethernet frame which conforms to the RFC 894 specification.

An A-MSDU sub-frame processing method proposed in the present disclosure will be described as follows, wherein the processing method may be divided into a processing method for generating an A-MSDU sub-frame and a processing method for decapsulating the A-MSDU.

Figure 4:
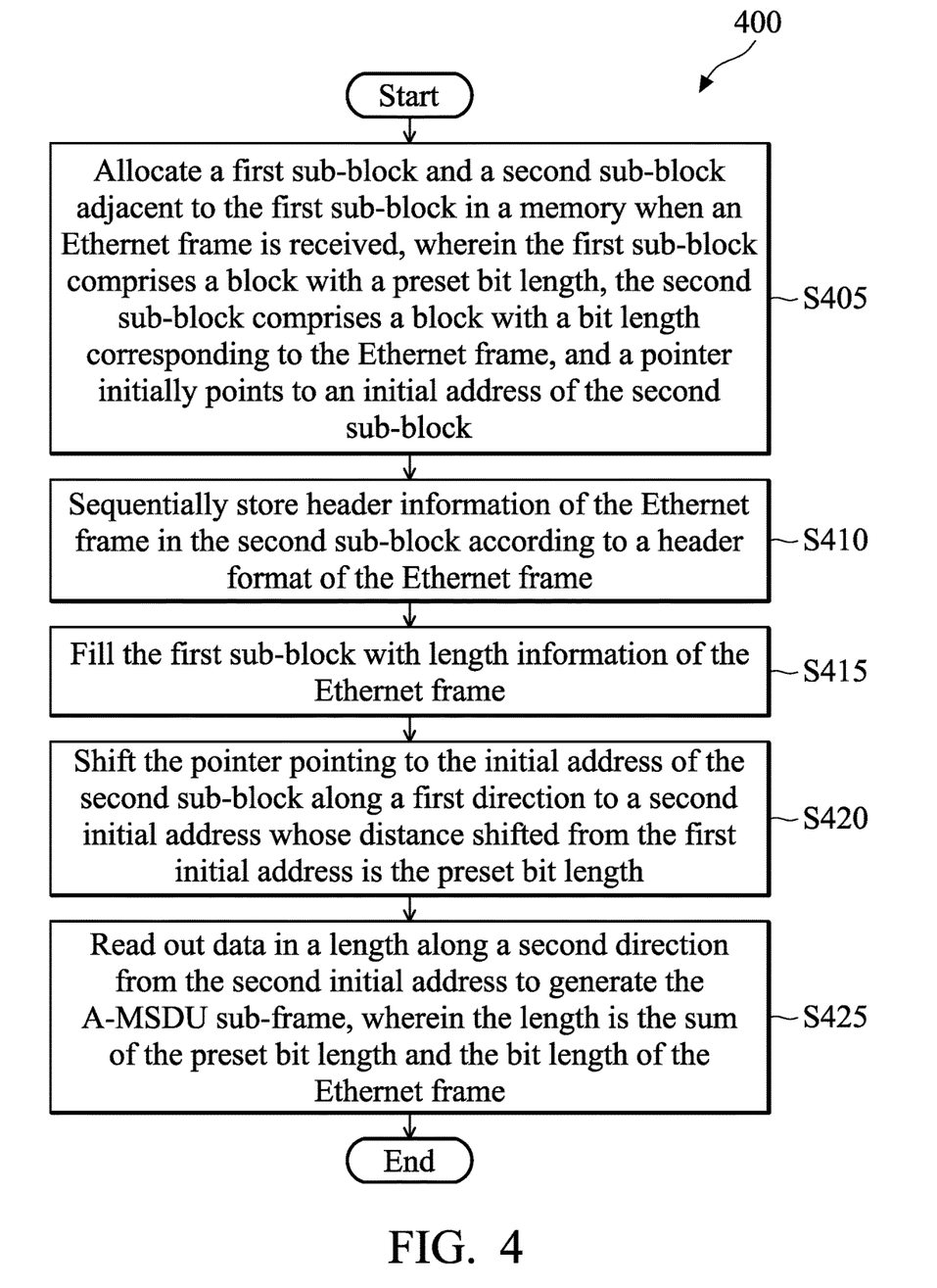
FIG. 4 is a flow diagram illustrating a method for generating an aggregated MAC service data unit (A-MSDU) sub-frame according to an embodiment of the present disclosure.

FIG. 4 is a flow diagram illustrating a method 400 for generating an aggregated MAC service data unit (A-MSDU) sub-frame according to an embodiment of the present disclosure, wherein the A-MSDU sub-frame is encapsulated in an A-MSDU packet. The A-MSDU sub-frame may be generated at a wireless access point and transmitted to another node or station in the wireless network. Although the method 400 may be applied to the wireless network access device 200 and described below, other elements may also be used to implement one or more of the steps described herein. In an embodiment, the wireless network access device 200 is configured to run the Linux operating system to perform related steps.

In step S405, the device allocates a first sub-block and a second sub-block adjacent to the first sub-block in a memory when an Ethernet frame is received, wherein the first sub-block comprises a block with a preset bit length, the second sub-block comprises a block with a bit length corresponding to the Ethernet frame, and a pointer initially points to an initial address of the second sub-block. Refer to the initial address in FIG. 5B, the pointer 520 is shown by the solid line. The pointer 520 is used to point to the address of the data to be read. In this embodiment, the pointer 520 initially points to the initial address in the second sub-block.

Figure 5A:
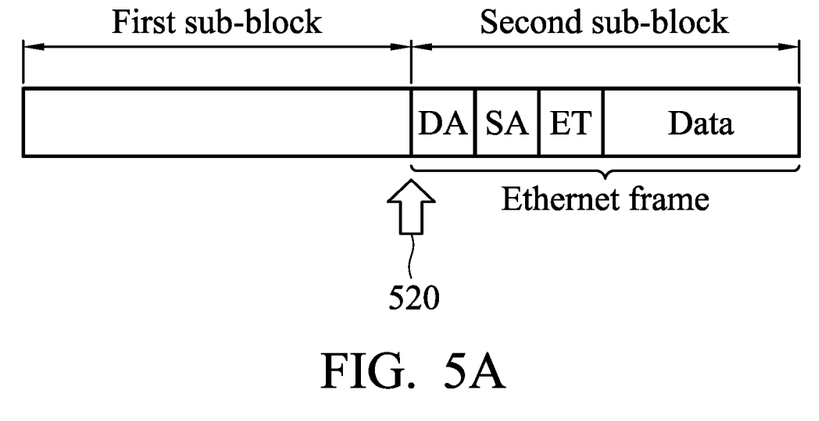
FIGS. 5A~5B are schematic diagrams illustrating a process for encapsulating an Ethernet frame in an aggregated MAC service data unit (A-MSDU) sub-frame according to an embodiment of the present disclosure.

In step S410, the device sequentially stores header information of the Ethernet frame in the second sub-block according to a header format of the Ethernet frame. Specifically, as shown in FIG. 5A, the processor sequentially stores the header information in the second sub-block according to the header format of the Ethernet frame, and the pointer 520 points to the initial address in the second sub-block.

In step S415, the device fills the first sub-block with length information of the Ethernet frame. In this embodiment, the processor writes the length information of the Ethernet frame into the range of the first sub-block according to length of the Ethernet frame, wherein the range is from the initial address in the sub-second block to a second initial address whose distance from the initial address is the preset bit length. In this embodiment, the processor writes the length information of the Ethernet frame according to a FILL command.

Figure 5B:
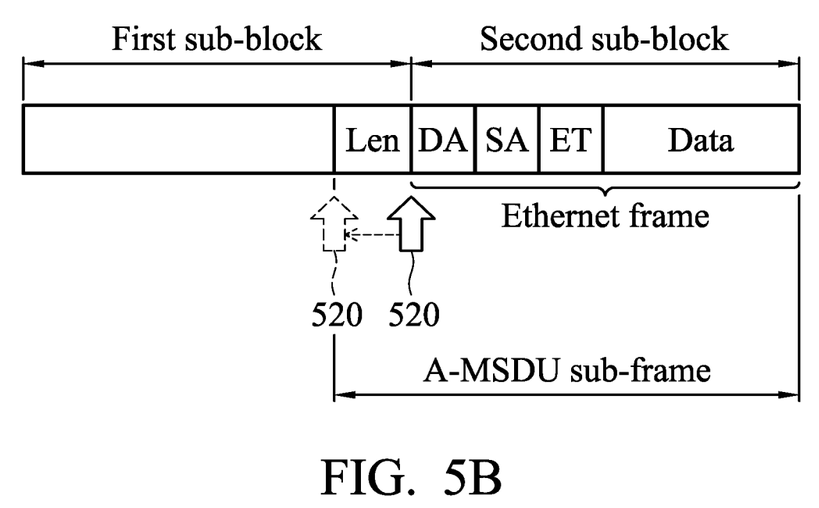

In step S420, the device shifts the pointer 520 pointing to the initial address in the second sub-block along a first direction (the pointer 520 is shifted to the left as illustrated in FIG. 5B) to the second initial address whose distance from the initial address in the second sub-block is the preset bit length, i.e., the distance of shifting the pointer 520 is the preset bit length. As indicated by the dotted line pointer 520 in FIG. 5B, in this embodiment, this step is performed by the processor according to a PUSH command. In this embodiment, the preset bit length is 2 bytes (that is, a binary code string of 16 bits can be written), which indicates that there are 65536 kinds of length information which may be placed in the block. However, it should be noted that those skilled in the art may know that the preset bit length can be adjusted according to actual requirements.

In step S425, the device reads out data in a length along a second direction from the second initial address to generate the A-MSDU sub-frame, wherein the length is the sum of the preset bit length and the bit length of the Ethernet frame. In this embodiment, the processor reads out the data from the position where the pointer is located (that is, from the second initial address) to the address whose distance shifted from the position is the length according to the length. The data sequentially read by the processor in the range is the data for generating the A-MSDU sub-frame. It should be noted that the length is obtained by adding the preset bit length and the Ethernet frame length. Therefore, the processor may generate the A-MSDU sub-frame by reading the data in the length range from the second initial address according to the pointer and the length information. In this embodiment, the step S425 is executed by the processor. In another embodiment, the step S425 may be executed by other modules instructed by the processor, for example, a direct memory access module (DMA). As shown above, the A-MSDU sub-frame is composed of the header format of the original Ethernet frame and the length information of the Ethernet frame. In addition, the step is used to describe that the step of generating a single A-MSDU sub-frame, wherein the A-MSDU sub-frame also includes a padding field. Although the padding field is not described in detail in this embodiment, those skilled in the art may understand that the A-MSDU sub-frame may optionally include the padding field. In addition, the step only discloses the process of generating a single A-MSDU sub-frame. Practically, the A-MSDU packet is composed of more than two A-MSDU sub-frames, and each A-MSDU sub-frame may be generated by executing the step S410 to step S425 repeatedly, so details related to the steps will be omitted.

As shown above, each Ethernet frame maintains its original format in each A-MSDU sub-frame. The processor executes shifting the pointer and filling with the length information of the Ethernet frame without copying the Ethernet frame to reduce the number of times that the processor moves the data to the memory for storage and improve the processing efficiency of the processor and the throughput.

Figure 6:
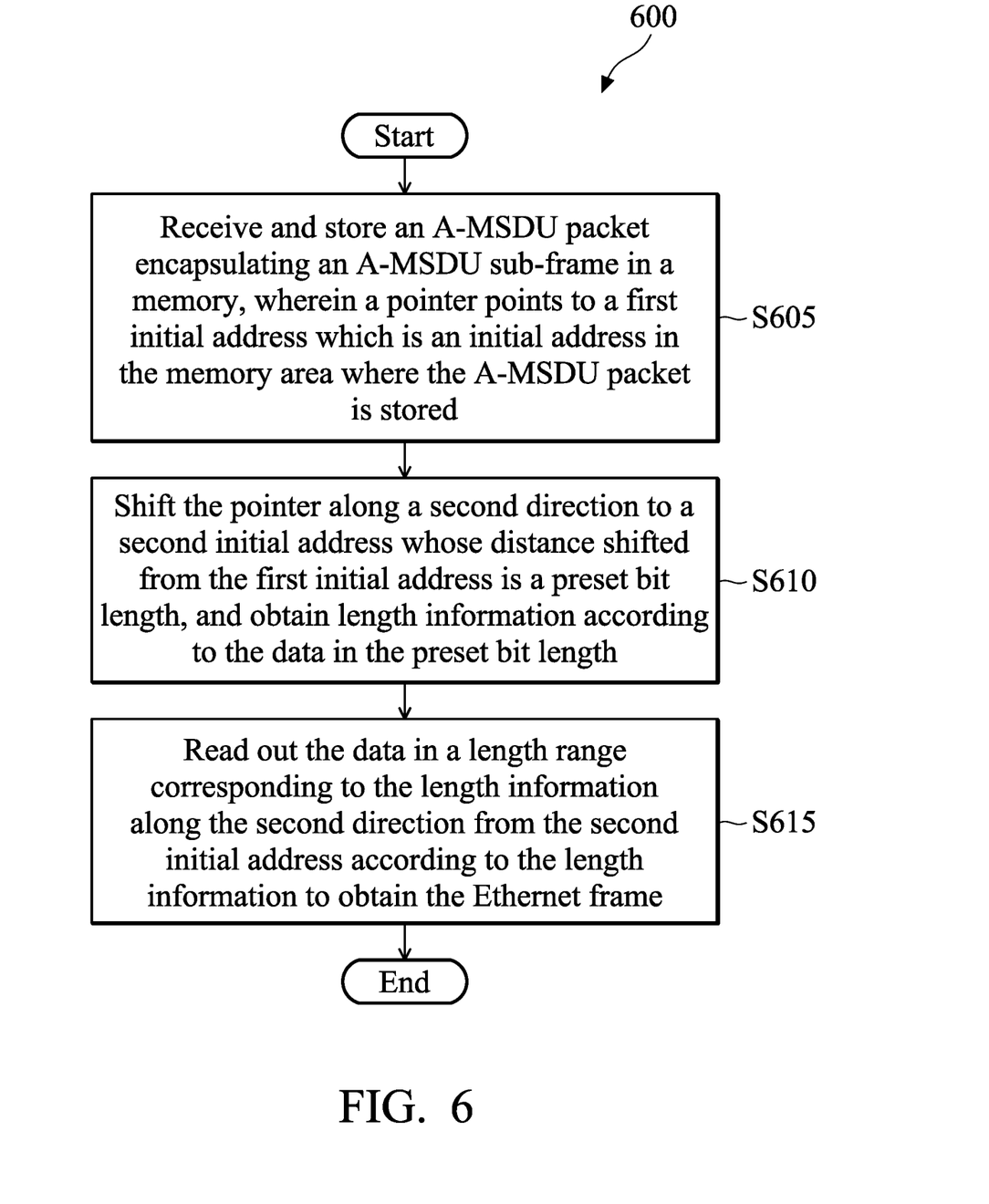
FIG. 6 is a flow diagram illustrating a method for decapsulating an A-MSDU sub-frame according to an embodiment of the present disclosure.

FIG. 6 is a flow diagram illustrating a method 600 for decapsulating an A-MSDU sub-frame according to an embodiment of the present disclosure. The A-MSDU packet comprising multiple A-MSDU sub-frames may be received at a node, a station, or a wireless access point in the wireless network. Although the method 600 may be applied to the wireless network access device 200 and described below, other elements may also be used to implement one or more of the steps described herein. In an embodiment, the wireless network access device 200 is configured to run the Linux operating system to perform related steps.

In step S605, the device receives and stores an A-MSDU packet encapsulating an A-MSDU sub-frame in a memory, wherein a pointer points to a first initial address which is an initial address in the memory area where the A-MSDU packet is stored. Specifically, the processor stores the A-MSDU packet in the memory when the device receives the A-MSDU packet in the embodiment. The pointer initially points to the first initial address which is an initial address in the memory area where the A-MSDU packet is stored, as shown by the solid line pointer 710 in FIG. 7A.

Figure 7A:
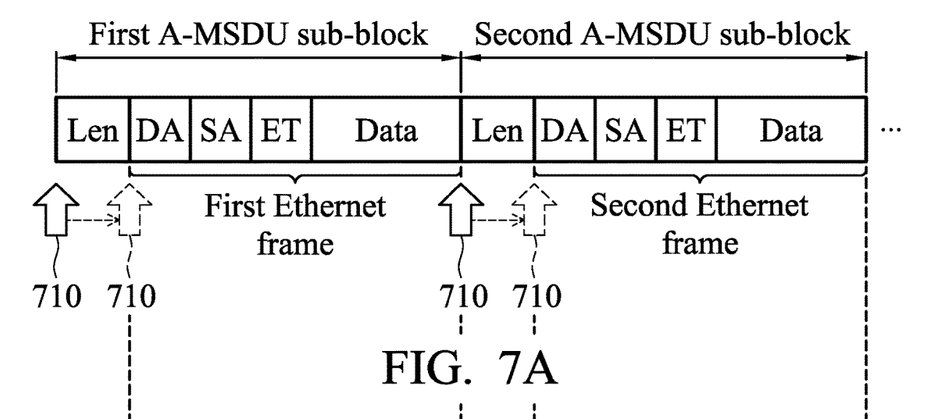
FIGS. 7A~7B are schematic diagrams illustrating a process for decapsulating aggregated MAC service data units (A-MSDUs) to Ethernet frames according to an embodiment of the present disclosure.
Figure 7B:
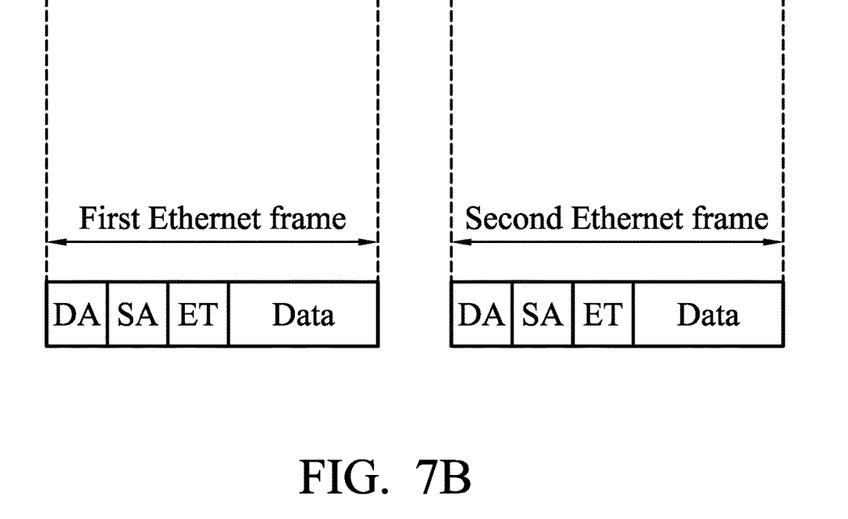

In step S610, the device shifts the pointer along a second direction to a second initial address whose distance shifted from the first initial address is a preset bit length, and obtains length information according to the data in the preset bit length. Refer to FIG. 7A, in this embodiment, the processor shifts the pointer 710 along the second direction according to a PULL command to the address whose distance shifted from the first initial address is the preset bit length (that is, the second initial address) as shown by the dotted line pointer 710 in FIG. 7A. The processor reads out the length information according to the data in the range from the first initial address to the second initial address, wherein the length information represents the bit length of the first Ethernet frame in the A-MSDU packet.

In step S615, the device sequentially reads out the data in a length range corresponding to the length information along the second direction from the second initial address according to the length information to obtain the Ethernet frame. In this embodiment, the processor reads out the address whose distance shifted from the second initial address is a distance corresponding to the length information according to the length information obtained in the previous step, and sequentially reads out the data in the range to obtain the first Ethernet frame. Steps S610 to S615 are executed repeatedly to obtain the second Ethernet frame.

As shown above, the processor merely needs to sequentially read the data corresponding to the length information in the memory according to the length information without performing multiple copy and move operations, so that the processor can decapsulate each Ethernet frame in the A-MSDU packet.

The various operations of the methods described above may be performed by any suitable devices capable of performing the corresponding functions. These devices may include various hardware and/or software elements and/or modules, including but not limited to circuits, application specific integrated circuits (ASICs), or processors.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

Use of ordinal terms such as "first," "second," "third," "fourth," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An A-MSDU sub-frame processing method, wherein the A-MSDU sub-frame is encapsulated in an A-MSDU packet, comprising:
   allocating a first sub-block and a second sub-block adjacent to the first sub-block in a memory when an Ethernet frame is received, wherein the first sub-block comprises a block with a preset bit length, the second sub-block comprises a block with a bit length corresponding to the Ethernet frame, and a pointer initially points to a first initial address in the second sub-block;
   sequentially storing header information of the Ethernet frame into the second sub-block according to a header format of the Ethernet frame;
   filling the first sub-block with length information of the Ethernet frame;
   shifting the pointer along a first direction to a second initial address whose distance shifted from the first initial address is the preset bit length; and
   reading out data in a length along a second direction from the second initial address to generate the A-MSDU sub-frame, wherein the length is the sum of the preset bit length and the bit length of the Ethernet frame.

2. The A-MSDU sub-frame processing method as claimed in claim 1, wherein the first sub-block is filled with the length information of the Ethernet frame according to a FILL command.

3. The A-MSDU sub-frame processing method as claimed in claim 1, wherein the pointer is shifted along the first direction to the second initial address whose distance shifted from the first initial address is the preset bit length according to a PUSH command.

4. The A-MSDU sub-frame processing method as claimed in claim 1, wherein the length information of the Ethernet frame is a string of binary code.

5. The A-MSDU sub-frame processing method as claimed in claim 1, wherein the step of reading the information in the length along the second direction from the second initial address is performed based on the pointer and the length.

6. The A-MSDU sub-frame processing method as claimed in claim 1, further comprising:
   receiving and storing the A-MSDU packet encapsulating the A-MSDU sub-frame in the memory, wherein the pointer points to a third initial address for storing the A-MSDU packet;
   shifting the pointer along the second direction to a fourth initial address whose distance shifted from the third initial address is the preset bit length and obtaining the length information according to data in the preset bit length; and
   sequentially reading data in a length range corresponding to the length information along the second direction from the fourth initial address according to the length information to obtain the Ethernet frame.

7. The A-MSDU sub-frame processing method as claimed in claim 6, wherein the pointer is shifted along the second direction to the fourth initial address whose distance shifted from the third initial address is the preset bit length according to a PULL command.

8. A wireless access device, comprising:
   a control circuit;
   a processor installed in the control circuit;
   a memory installed in the control circuit and operatively coupled to the processor;
   wherein the processor is configured to execute program code stored in the memory to perform operations comprising:
   allocating a first sub-block and a second sub-block adjacent to the first sub-block in a memory when an Ethernet frame is received, wherein the first sub-block comprises a block with a preset bit length, the second sub-block comprises a block with a bit length corresponding to the Ethernet frame, and a pointer initially points to a first initial address in the second sub-block;
   sequentially storing header information of the Ethernet frame into the second sub-block according to a header format of the Ethernet frame;

filling the first sub-block with length information of the Ethernet frame;

shifting the pointer along a first direction to a second initial address whose distance shifted from the first initial address is the preset bit length; and reading out data in a length along a second direction from the second initial address to generate the A-MSDU sub-frame, wherein the length is the sum of the preset bit length and the bit length of the Ethernet frame.

9. The wireless access device as claimed in claim 8, wherein the processor fills the first sub-block with the length information of the Ethernet frame according to a FILL command.

10. The wireless access device as claimed in claim 8, wherein the processor shifts the pointer along the first direction to the second initial address whose distance shifted from the first initial address is the preset bit length according to a PUSH command.

11. The wireless access device as claimed in claim 8, wherein the length information of the Ethernet frame is a string of binary code.

12. The wireless access device as claimed in claim 8, wherein the processor reads out the information in the length along the second direction from the second initial address based on the pointer and the length.

13. The wireless access device as claimed in claim 8, wherein the processor further executes the program code stored in the memory to perform operations comprising:

receiving and storing the A-MSDU packet encapsulating the A-MSDU sub-frame in the memory, wherein the pointer points to a third initial address for storing the A-MSDU packet;

shifting the pointer along the second direction to a fourth initial address whose distance shifted from the third initial address is the preset bit length and obtaining the length information according to data in the preset bit length; and sequentially reading data in a length range corresponding to the length information along the second direction from the fourth initial address according to the length information to obtain the Ethernet frame.

14. The wireless access device as claimed in claim 13, wherein the processor shifts the pointer along the second direction to the fourth initial address whose distance shifted from the third initial address is the preset bit length according to a PULL command.

\* \* \* \* \*